(12) United States Patent
Willner et al.

(10) Patent No.: US 10,855,138 B2
(45) Date of Patent: Dec. 1, 2020

(54) ELECTRICAL MACHINE AND METHOD FOR PRODUCING AN ELECTRICAL MACHINE

(71) Applicant: Robert Bosch GmbH, Stuttgart (DE)

(72) Inventors: Anik Willner, Karlsruhe (DE); Armin Stubner, Buehl-Altschweier (DE); Christian Meyer, Karlsruhe-Wolfartsweier (DE); Jean-Marc Ritt, Strasbourg (FR); Torsten Gmuend, Rastatt-Pliitersdorf (DE)

(73) Assignee: Robert Bosch GmbH, Stuttgart (DE)

( * ) Notice: Subject to any disclaimer, the term of this patent is extended or adjusted under 35 U.S.C. 154(b) by 924 days.

(21) Appl. No.: 15/466,958

(22) Filed: Mar. 23, 2017

(65) Prior Publication Data
US 2017/0279330 A1 Sep. 28, 2017

(30) Foreign Application Priority Data
Mar. 24, 2016 (DE) .................. 10 2016 204 958

(51) Int. Cl.
| | |
|---|---|
| H02K 5/22 | (2006.01) |
| H02K 11/215 | (2016.01) |
| H01R 4/02 | (2006.01) |
| H02K 3/28 | (2006.01) |
| H02K 5/16 | (2006.01) |
| H02K 11/02 | (2016.01) |
| H02K 15/00 | (2006.01) |

(52) U.S. Cl.
CPC ............. *H02K 5/225* (2013.01); *H01R 4/029* (2013.01); *H02K 3/28* (2013.01); *H02K 5/161* (2013.01); *H02K 11/02* (2013.01); *H02K 11/215* (2016.01); *H02K 15/0081* (2013.01); *H02K 2211/03* (2013.01)

(58) Field of Classification Search
CPC ........ H02K 5/225; H02K 11/215; H02K 3/28; H02K 5/161; H02K 11/02; H01R 4/029
USPC ........................................... 310/71
See application file for complete search history.

(56) References Cited

U.S. PATENT DOCUMENTS

| | | | |
|---|---|---|---|
| 2007/0070062 A1 | 3/2007 | Boll | |
| 2010/0072840 A1* | 3/2010 | Sahara | H02K 3/522 310/71 |

(Continued)

FOREIGN PATENT DOCUMENTS

| | | |
|---|---|---|
| CN | 104823365 A | 8/2015 |
| DE | 10323482 A1 | 12/2004 |

(Continued)

*Primary Examiner* — Terrance L Kenerly
(74) *Attorney, Agent, or Firm* — Michael Best & Friedrich LLP

(57) ABSTRACT

An electrical machine (10) and a method for producing such a machine, with a pole pot (15), in which a stator (16) and a rotor (18) are held, and axially on the open side of the pole pot (15) a connector housing (33) with an integrated terminal connector (37) is arranged, wherein the connector housing (33) has a circumferential wall (83), which lies axially against the pole pot (15), and the circumferential wall (83) has radial windows (110), in order to make electrical contacting of electrical contacts (30) of the connector housing (33) with electrical mating contacts (133) of the stator (16) possible after the placement of the connector housing (33) onto the pole pot (15).

22 Claims, 5 Drawing Sheets

(56) References Cited

U.S. PATENT DOCUMENTS

| | | | |
|---|---|---|---|
| 2012/0286604 A1 | 11/2012 | Abe et al. | |
| 2012/0286605 A1* | 11/2012 | Miyachi | H02K 11/33 |
| | | | 310/71 |
| 2013/0002069 A1 | 1/2013 | Matsumoto | |

FOREIGN PATENT DOCUMENTS

| | | |
|---|---|---|
| DE | 10323462 | 1/2005 |
| DE | 102012012753 | 1/2013 |
| DE | 102011084763 | 4/2013 |
| DE | 102013218133 | 3/2015 |

* cited by examiner

ELECTRICAL MACHINE AND METHOD FOR PRODUCING AN ELECTRICAL MACHINE

BACKGROUND OF THE INVENTION

The invention relates to an electrical machine, and also to a method for producing such an electrical machine.

DE 10 2011 084 763 A1 discloses an electrical machine in which a stator is arranged in a pole pot. Arranged on the pole pot is a cover part, in which a rotor shaft is mounted. Here, the cover part is produced from plastic and has electrical conductor elements for interconnecting the electrical winding of the stator. In this case, the coil wire ends of the windings is led axially through the cover part and connected to the conductor elements on the upper side of the cover part. The cover part has a lateral extension, which is formed as a terminal connector, the pins of which are connected both to the conductor elements and to a printed circuit board. Arranged at a free end of the rotor shaft is a signal transmitter for rotor position identification. Lying axially opposite the signal transmitter is the printed circuit board, arranged on which is a sensor element (not represented any more specifically) for signal evaluation.

A disadvantage of such a configuration is that such a printed circuit board is not suitable for use at high temperatures, since the soldered connections on the printed circuit board could then become detached. There is also the risk that the electrical connections between the printed circuit board and the connecting elements of the plastic bearing plate could be destroyed if the electrical machine undergoes high vibrational loading. During assembly, the electrical contacts of the conductor elements must first be led out to the terminal connector before the printed circuit board can then be placed on in a separate step of the process.

SUMMARY OF THE INVENTION

The device according to the invention and the method according to the invention have the advantage that the formation of the radial windows in the connector housing provides a possibility that the electrical contacts of the connector housing may be contacted with the electrical conductors coming from the stator only after the connector housing has been arranged on the pole pot. As a result, all of the electrical and electronic components inside the connector housing may be preassembled and contacted with one another in advance, so that after assembly of the connector housing there is no longer any need to attach a printed circuit board or other electrical or electronic components. The radial reaching of the welding tongs through the radial windows in the circumferential wall of the connector housing allows the welded connections to be advantageously formed within the cavity of the connector housing, as a result of which no additional installation space is necessary axially or radially outside the connector housing. The arrangement of the electrical contacts and the corresponding mating contacts can take place so far radially outward within the connector housing that the welding tongs can easily reach around the contacts with the mating contacts through the radial windows. This ensures a reliable contacting process, in which no other electrical components or contacts can be damaged by the welding tools.

The formation of the welded connection between the electrical contacts of the connector housing and the electrical mating contacts of the stator allows the electrical machine to be used at very high ambient temperatures, at which for example soldered connections are destroyed. Similarly, such welded connections are very robust with respect to external vibrations, so that the electrical machine can for example be exposed even to external accelerations of up to 30 g (g=gravitational acceleration). Preferably, the welded connection is performed by resistance welding, in which a welding tong reaches radially into the radial windows of the connector housing and presses together and welds the electrical contacts with the mating contacts. Alternatively, it is however also possible to perform these welded connections by means of laser welding, in which the laser beam impinges on the electrical contacts and mating contacts through the radial openings.

Preferably, these welded contacts are formed for the electrical conductors that supply power to the electrical coils for the electrical machine. In this case, the current pins of the terminal connector conduct the current by way of the welded connections to the terminal pins of the interconnection board, which in turn have previously been contacted with the electrical coils of the stator. By way of these connections, the electrical machine can also be supplied with high motor currents. It is particularly favorable here that both the contact lugs of the connector housing extend axially downward and the terminal pins of the interconnection board extend axially upward into the interior of the connector housing, so that they can be welded to one another directly in this way.

The interconnection board is made particularly compact by conductor elements being encapsulated as inserts in a body of plastic. On the one hand, the terminal pins for the electrical contacts in the connector housing extend out of the body of plastic. On the other hand, fastening regions of the conductor elements that are connected directly to the electrical coils, in particular the coil wire end thereof, protrude out of the body of plastic. For a compact design of the electrical machine, the interconnection board lies axially directly over the coils and is enclosed by a bearing plate arranged thereover, which is for example securely welded to the pole pot. The terminal pins of the interconnection board in this case advantageously extend axially through corresponding clearances in the bearing plate.

If the electrical contacts of the connector housing overlap in the axial direction with the mating contacts of the stator, no additional installation space for the forming of the welded connections is required in the connector housing.

In order to compensate for different thermal expansions of the individual components of the electrical machine over a great temperature range, the contact lugs on the connector housing are formed with an elastic region. Similarly, the terminal pins are attached to the conductor elements of the interconnection board by way of resilient regions. This allows both temperature fluctuations and vibrations to be compensated without the welded connection being destroyed.

In addition to the current contacts U, V and W, a terminal wire of a capacitor arranged in the connector housing is also welded to a corresponding ground contact on the bearing plate. The capacitor is preferably connected as an interference suppression capacitor to a sensor element in the connector housing. The ground contact is arranged particularly favorably as a well-conducting, axially projecting contact lug on the bearing plate, which is in turn welded to the pole pot. In the case of this connection, the terminal wire of the capacitor can also be connected by means of the same welding process directly to the ground contact by the reaching of the welding tool through a corresponding radial window in the connector housing.

The sensor in the connector housing is formed particularly favorably as a magnetic field sensor, which is arranged axially opposite a corresponding signal transmitter, which in turn is fastened on the free end of the rotor shaft. The rotor shaft in this case protrudes through the bearing plate into the interior of the connector housing, so that the sensor magnet is arranged axially very close to the sensor element. The contact lugs of the power supply and the interference suppression capacitor are arranged here radially outside the sensor magnet and the signal transmitter, so that the welding processes do not affect the sensor system.

The connector housing is inserted axially in the correct rotational position with respect to the interconnection board by means of centering means. This ensures that the electrical contacts and the mating contacts are arranged so close together in the circumferential direction that they can together be reached around directly by the welding tool. For the correct rotational position (centering in the circumferential direction), there are for example on the bearing plate that is securely welded to the pole pot both axial centering lugs angled away upward and angled away downward, which respectively reach into corresponding centering receptacles in the connector housing and into the interconnection board.

The connector housing is advantageously formed as a plastics injection-molded component, the terminal connector with the connector collar being an integral part of this component. The connector housing has an annular circumferential wall, which axially adjoins the pole pot. The terminal connector is in this case arranged on an upper axial cover wall and preferably does not protrude radially beyond the outside diameter of the circumferential wall. In the cylindrical circumferential wall, the radial windows may be formed as sufficiently large clearances in a very easy way during the injection molding. In this case, the axial lower edge of the circumferential wall that is formed uninterruptedly in the circumferential direction provides sufficient stability of the connector housing, the formation of the radial windows at the same time saving plastics material. In the circumferential wall there are preferably formed precisely three radial windows, through which the welding tool can respectively form the welded connections for the current contacts U, V and W. It is particularly favorable to form an additional fourth radial window, through which the interference suppression capacitor can be welded to the ground contact.

In order to seal the housing of the electrical machine outwardly, after the welding of the electrical contacts to the mating contacts there is fitted over the connector housing a cylindrical metal housing, which completely covers the radial windows. The metal housing is on the one hand securely welded in a sealed manner to the pole pot and sealed off by means of a sealing ring with respect to the terminal connector, which protrudes axially upward through the metal housing through a corresponding clearance. The welding of the metal cover onto the pole housing allows the connector housing to be kept at a constant distance from the signal transmitter by way of the axial spring element, so that the sensor signal of the rotor position detection remains satisfactorily constant throughout all operating conditions. In the case of this method of production, all of the process steps can be performed in the axial direction, which greatly simplifies the construction of the production lines.

The method of production according to the invention allows both the stator with the bearing plate and the connector housing to be respectively produced as prefabricated units, which are then fitted axially in one another. Through the radial windows in the connector housing, the electrical contacts can then be electrically connected to the corresponding mating contacts within the housing. In this case, all of the electrical contacts with the corresponding mating contacts are arranged radially within the circumferential wall of the connector housing and radially within the outside diameter of the pole pot, so that the electrical machine is of a slender cylindrical design without radial overhangs.

It is particularly favorable after the insertion of the wound coil former and the rotor into the pole pot to insert the interconnection board axially directly and to close off the pole pot with the bearing plate. If the bearing plate is securely welded to the outer radial edge of the open pole pot, this forms a prefabricated structural unit, in which the rotor is already completely mounted. The terminal pins of the interconnection board can protrude axially upward through clearances in the bearing plate, in order to be connected later to the electrical contacts of the connector housing. The welding of the bearing plate to the pole pot stiffens the overall construction of the electrical machine and provides the heat dissipation from the electrical windings, whereby overheating of the magnetic field sensor is avoided.

Similarly, the connector housing may be provided in advance complete with all of the electrical and electronic components, and they may be electrically contacted with one another, for which purpose electrical conductors are advantageously encapsulated as inserts in the connector housing. If a rotary position sensor and corresponding interference suppression components are fastened directly to the inner wall of the connector housing without the use of a printed circuit board, these electronic components can also be used at very high ambient temperatures. The formation of the electrical contacts inside the connector housing allows the connector pins and, if applicable, the electrical and/or electronic components to be electrically connected in an easy way to corresponding mating contacts after the pressing of the connector housing into the pole pot.

It is particularly favorable from technical aspects of the process if all of the welded contacts between the electrical contacts and the mating contacts are carried out with the same welding tool, it being possible for example for all four contacts to be carried out simultaneously by the reaching of a number of welding tools into the radial windows, or for the individual welded connections to be performed one after the other with a single welding tool. After the completion of the welded connections, there may be placed over the connector housing a further metal housing, which is sealed off both with respect to the pole pot and with respect to the terminal connector, which protrudes outwardly through an axial clearance in the metal housing.

BRIEF DESCRIPTION OF THE DRAWINGS

Exemplary embodiments of the invention are explained in more detail in the following description and are represented in the drawings, in which.

DETAILED DESCRIPTION

Figure 1:
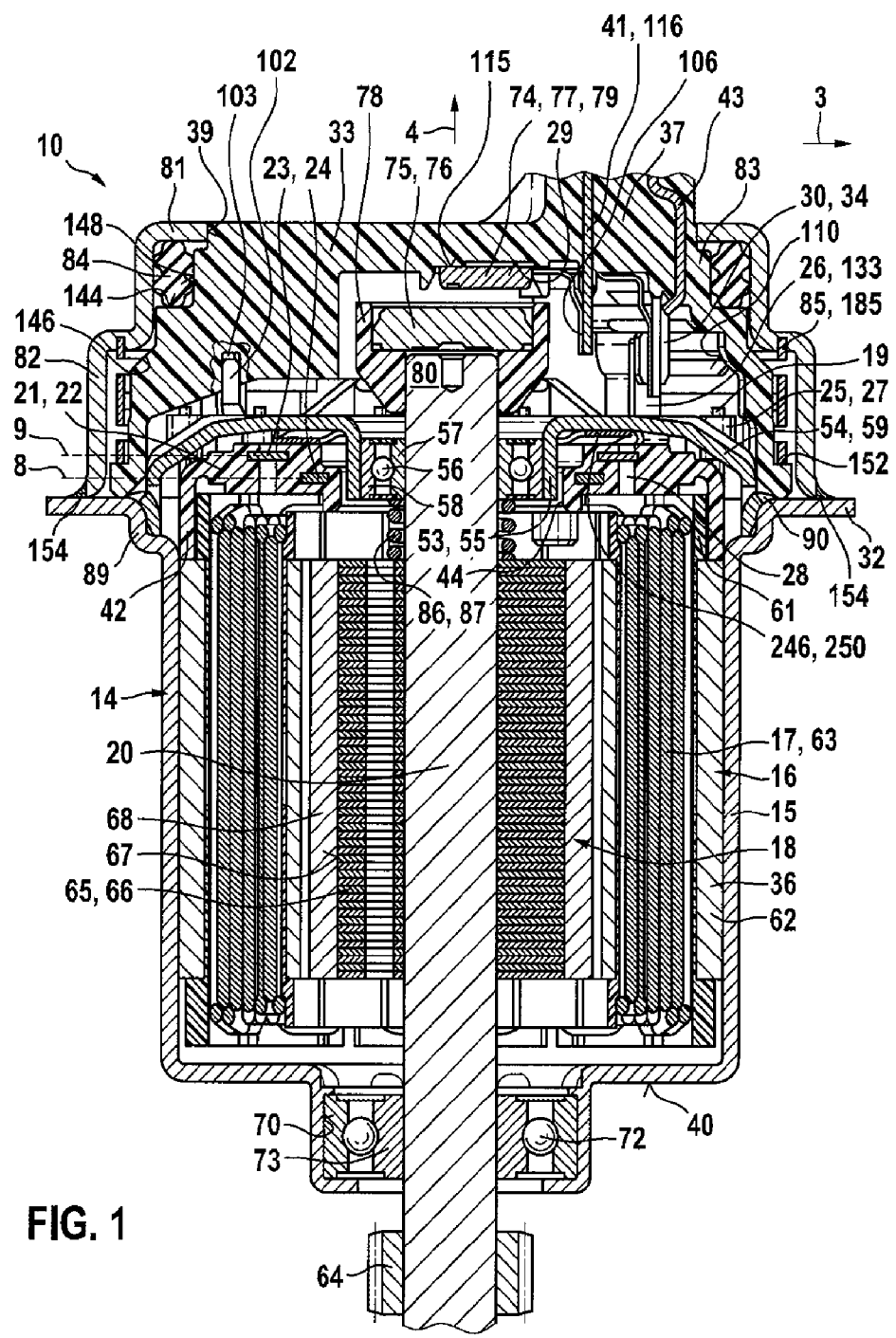
FIG. 1 shows a section through a first exemplary embodiment of an electrical machine according to the invention.

FIG. 1 shows an exemplary embodiment of a ready-assembled electrical machine 10, in which a stator 16 is fitted in a housing 14 of an electrical machine 10. In this case, the stator 16 has coil formers 36, which are for example formed separately as individual segments 62, and are wound with electrical windings 17. In this case, the housing 14 serves as a pole pot 15, which forms a magnetic return for the electrical windings 17. The pole pot 15 has at its open end a flange 32, placed on which are further components. In the exemplary embodiment according to FIG. 1, the pole pot 15 has on its bottom face 40 an opening, through which a rotor shaft 20 protrudes, in order to transfer a torque of the electrical machine 10 by way of an output element 64 to a gear transmission element that is not represented. Formed on the bottom face 40 is a first bearing seat 70, in which a first rolling bearing 72 is inserted. The inner ring 73 of the first rolling bearing 72 is in this case securely connected to the rotor shaft 20. Consequently, the first rolling bearing 72 forms a fixed bearing for the rotor 18. The rotor 18 has a rotor body 65, which bears permanent magnets 68, which interact with the electrical windings 17. The rotor body 65 consists for example of individual, stacked sheet-metal laminations 66, in which clearances 67 for the permanent magnets 68 have been punched out. The coil wire ends 19 of the windings 17 protrude in the axial direction 4 beyond the electrical coils 63. An interconnection board 22 has been placed axially onto the stator 16, connector elements 23 that protrude out of a body of plastic 21 being connected to the coil wire of the coils 63 at fastening portions 25. In this case, the electrical connections between the coil wire and the fastening portions 25 are formed for example by welding, soldering or crimping. In the exemplary embodiment described, precisely three conductor elements 23 respectively have a connection pin 26 for the phases U, V and W. The body of plastic 21 is supported in the axial direction 4 by way of formed-on spacers 42 on the stator 16. The spacers 42 of the interconnection board 22 are formed on at its radially outer edge. In the exemplary embodiment, the spacers 42 lie against the coil former elements 36, on which the electrical windings 17 are wound. The coil former elements 36 are formed here as individual segments 62 for each coil 63. In this case, an insulating mask 61 for the electrical windings 17 is respectively arranged on the coil former elements 36. The body of plastic 21 is formed annularly, so that in its central clearance 44 the rotor shaft 20 of the rotor 18 can protrude through.

Arranged axially above the interconnection board 22 is a bearing plate 54, which is welded at its radially outer edge 96 to the pole pot 15. The bearing plate 54 has a second bearing seat 55, which reaches axially into the central clearance 44 of the interconnection board 22. Held in the second bearing seat 55 is a second rolling bearing 56, by means of which the motor shaft 20 is mounted rotatably in the stator 16. The second rolling bearing 56 is formed for example as a ball bearing and represents a movable bearing for the rotor 18. In this case, an outer ring 58 of the second rolling bearing 56 is fastened in the second bearing seat 55 in such a way that it can rotate therewith and the inner ring 57 is fastened on the rotor shaft 20 in such a way that it can be displaced axially. The second rolling bearing 56 is in this case arranged axially in the same plane as the interconnection board 22, so that the electrical machine 10 is formed very compactly in the axial direction 4. The bearing plate 54 has in the exemplary embodiment individual radial webs 59, between which the fastening portions 25, formed as receiving sleeves 27, protrude radially upward. Fitted in holes 35 of the receiving sleeves 27 are coil wire ends 19 of the coils 63, which for example protrude in the axial direction 4 slightly upward beyond the receiving sleeve 27—and preferably beyond the bearing plate 54. Similarly, the terminal pins 26 extend from the body of plastic 21 through the bearing plate 54, in order to be able to be connected to corresponding contacts 30 of the terminal connector 37. In the sectional representation through the body of plastic 21, connecting portions 24 of various conductor elements 23 can be seen in cross section. The flattened cross sections are arranged offset in relation to one another both with respect to the axial direction 4 and with respect to the radial direction 3. This allows for example four individual conductor elements 23 to be arranged in precisely two axial planes 8, 9. In the sectional representation, axial channels 28 can be seen in the body of plastic 21, created by holding tools for the conductor elements 23 in the injection mold. The interconnection board 22 is pressed axially downward against the coil formers 36 by axial spring means 246 for vibration damping. The spring means 246 are formed for example as an axial spring ring, which encloses the rotor shaft 20. The spring ring is preferably formed as a corrugated ring 250, which is supported axially on the bearing plate 54 and on the interconnection board 22. The spring means 246 produces an axial prestress, which keeps the interconnection board 22 exactly positioned even over a great temperature range and under great vibrational loads. The rotor 18 is axially prestressed with respect to the second rolling bearing 56 by means of a compression spring 86. The compression spring 86—for example a spiral spring 87—is supported on the one hand on the rotor body 65 and on the other hand on the inner ring 57 of the second rolling bearing 56.

Arranged above the bearing plate 54 is a connector housing 33, on which an outer terminal connector 37 (not represented any more specifically) is arranged for supplying power to the electrical machine 10. Arranged on the connector housing 33, on its inner side 29, are the electrical contacts 30, which are connected to the terminal pins 26 of the interconnection board 22. The interconnection board 22 is connected both to the coil wire ends 19 and to the electrical contacts 30 of the terminal connector 37. For example, the electrical contacts 30 extend as contact lugs 34 axially downward, so that they are arranged directly adjacent the terminal pins 26 and are then for example welded to one another. In order to ensure the correct position of the terminal pins 26 in the circumferential direction 2, the interconnection board 22 has both with respect to the stator 16 and with respect to the bearing plate 54 positioning elements 101, which interact with corresponding mating elements 100. Similarly, the connector housing 33 is positioned with respect to the bearing plate 54 by means of a rotation prevention 103, 102. Fastened in the connector housing 33 is a sensor element 74, which interacts with a signal transmitter 75 on the rotor shaft 20 to detect its rotor position. For this purpose, after the assembly of the bearing plate 54, a magnet holder 78, which holds a sensor magnet 76, is pressed onto the free end 80 of the rotor shaft 20. The rotating magnetic field of said magnet is detected by the sensor element 74, which is formed as a highly resolving magnetic field sensor 77. Fitted onto the connector housing 33 is a metal cover 81, which is securely welded in a sealed manner to the flange 32 of the pole pot 15. Both the connector housing 33 and the metal cover 81 respectively have a circular circumferential wall 82, 83, arranged radially next to one another. Pressed in between the connector housing 33 and the inner side of the metal cover 81 is a radial sealing ring 84, which seals off the electrical machine 10 with respect to the terminal connector 37. Also arranged between the connector housing 33 and the metal cover 81 is an axial spring element 85, which presses the connector housing 33 axially against the flange 32 of the pole pot 15.

Figure 2:
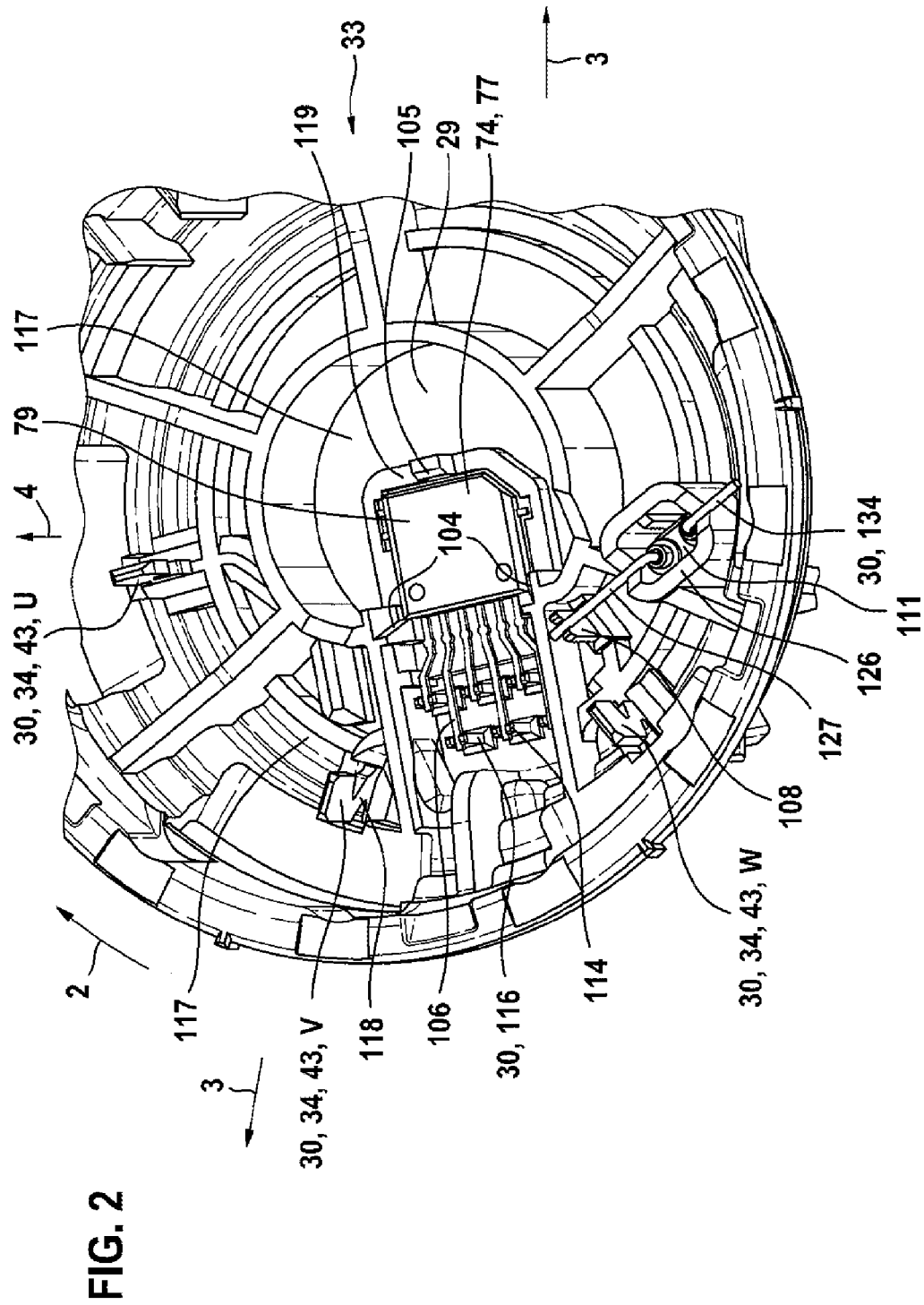
FIG. 2 shows a plan view of the inner side of the connector housing according to FIG. 1.

FIG. 2 shows a view into the connector housing 33 before it is placed onto the pole pot 15. The terminal connector 37, which protrudes axially on the outer side of the connector housing 33, cannot be seen in this representation. In the connector housing 33, electrical contacts 30 are encapsulated with the plastics material of the cover wall 117 of the connector housing 33. In this case, the current pins 43 on the inner side 29 of the cover wall 117 form contact lugs 34, which project axially downward. The contact lugs 34 have an elastic region 118, in order to facilitate the welding of the contact lugs 34 to the corresponding terminal pins 26 of the interconnection board 22. Together with the elastic regions 38, with which the terminal pins 26 are formed on the interconnection board 22, they can compensate for different thermal expansions over a great temperature range. In the exemplary embodiment, precisely three contact lugs 34 are formed, forming on the terminal connector 37 the three current pins 43 for the three phases U, V and W. Also projecting from the inner side 29 of the connector housing 33 are insert conductors 116, which form the sensor pins 41 at their opposite ends in the terminal connector 37. Here, the insert conductors 116 emerge axially from the cover wall 117 and have at their ends a fork 114, in which terminal legs 106 of the sensor element 74 are inserted. Here, the terminal legs 106 run along the inner side 29 of the cover wall 117 transversely in relation to the rotor axis. The terminal legs 106 are then securely welded in the forks 114 of the insert conductors 116, preferably by means of resistance welding. In order that sufficient space is available for the welding tools, the insert conductors 116 are arranged in two rows of for example three electrical contacts 30 each. As a result, some of the terminal legs 106 are formed as shorter and some are formed as longer. The sensor element 74 has a sensor housing 79, from which the terminal legs 106 emerge laterally. The sensor housing 79 is in this case formed approximately rectangularly, so that its base area 115 extends almost parallel to the cover wall 117. The sensor housing 79 is arranged within a receiving frame 119, which is formed on the inner side 29 of the cover wall 117. This receiving frame 119 forms a form fit with the sensor housing 79 with respect to the radial direction 3. For the assembly of the sensor element 74 in the connector housing 33, formed on the inner side 29 are guiding ribs 104, on which the sensor housing 79 slides into the receiving frame 119. In this case, the sensor housing 79 is assembled in the axial direction 4, so that the guiding ribs 104 form lead-in bevels in the axial direction 4. In the exemplary embodiment, two guiding ribs 104 formed at right angles to one another, which position the sensor housing 79 at its exact axial position, are respectively arranged. Formed on the receiving frame 119 is a pinch rib 105, which fixes the sensor housing 79 in the receiving frame 119 until the sensor element 74 is securely adhesively fixed in the connector housing 33. An interference suppression capacitor 111 is also fastened to the inner side 29 of the connector housing 33. For this purpose, a capacitor receptacle 126, in which the interference suppression capacitor 111 is adhesively fixed, is formed on the inner side 29. The capacitor receptacle 126 takes the form here of an axial sleeve, which receives the adhesive for the fastening of the interference suppression capacitor 111. A first capacitor terminal 127 is electrically connected to a capacitor contact 108, which is likewise injection-molded as an insert in the connector housing 33. The capacitor contact 108 is in this case electrically connected to the sensor element 74. For this purpose, at least one insert conductor 116 for the terminal legs 106 has an electrical connection with the capacitor contact 108. In this preassembly step, the second capacitor terminal 134 remains formed as a free terminal wire, and is only electrically connected, preferably welded, to a corresponding ground contact 95 of the bearing plate 54 after the placement of the connector housing 33 onto the pole pot 15.

Figure 5:
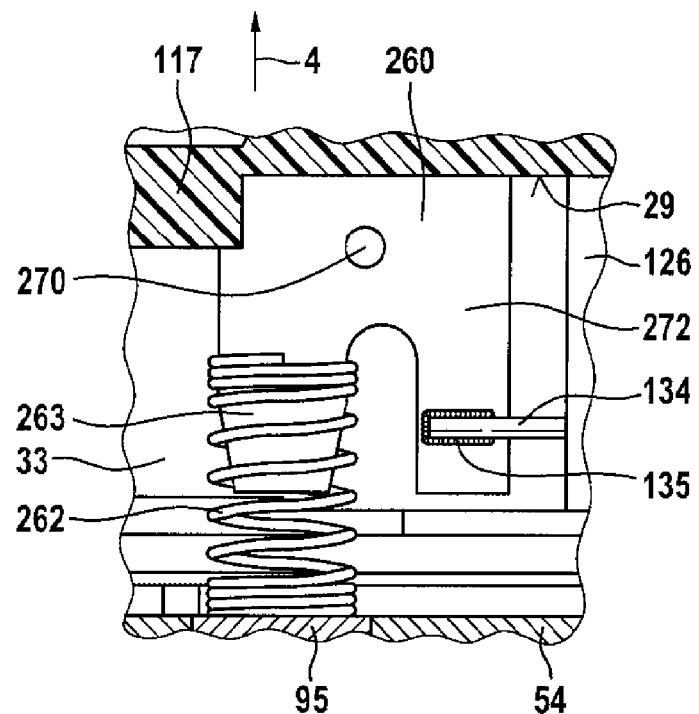
FIG. 5 shows an alternative embodiment in which the second capacitor contact is connected to a contact element by means of a welded connection at a contact tongue of the contact element.
Figure 6:
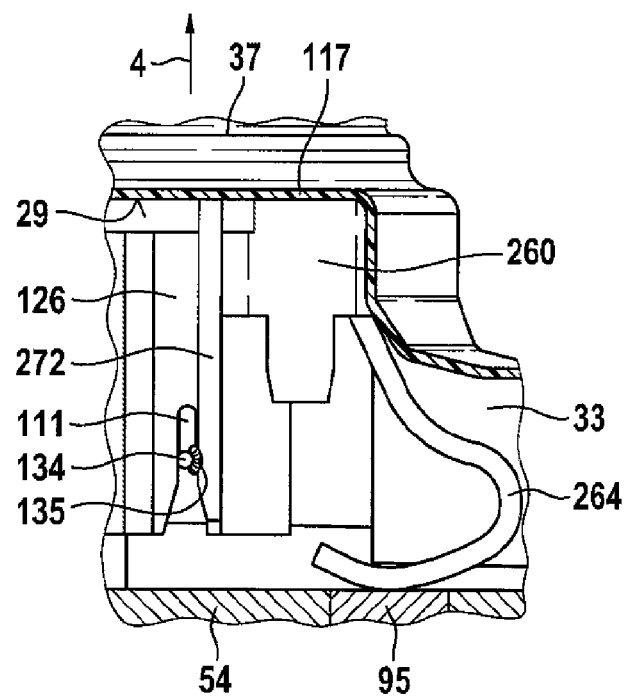
FIG. 6 shows an alternative embodiment in which the contact element has an integrated spring arm instead of the separate contact spring.

Alternatively, according to FIG. 5, the second capacitor contact 134 is connected to a contact element 260, preferably by means of a welded connection 135 at a contact tongue 272 of the contact element 260. The contact element 260 is fastened to the connector housing 33—for example injection-molded in it. A contact spring 262 is then fitted onto the contact element 260, and as a result is electrically connected to the contact element 260. The contact spring 262 extends in the axial direction 4 toward the bearing plate 54. In FIG. 5, the contact spring 262 is formed as a spiral spring, which has been pushed directly onto an axially tapering continuation 263. If the connector housing 33 is placed with the contact element 260 onto the pole pot 15, the contact spring 262 presses axially against the bearing plate 54 and thereby establishes a ground contact 95 with respect to the pole housing 15. Instead of the separate contact spring 262, according to FIG. 6 the contact element 260 may also have an integrated spring arm 264, which extends in the axial direction 4 and consequently the contact element 260 directly forms the ground contact 95 with the bearing plate 54 during the placement onto the pole pot 15. The second capacitor contact 134 is in turn preferably contacted by means of a welded connection 135 on the contact tongue 272 of the contact element 260.

Figure 3:
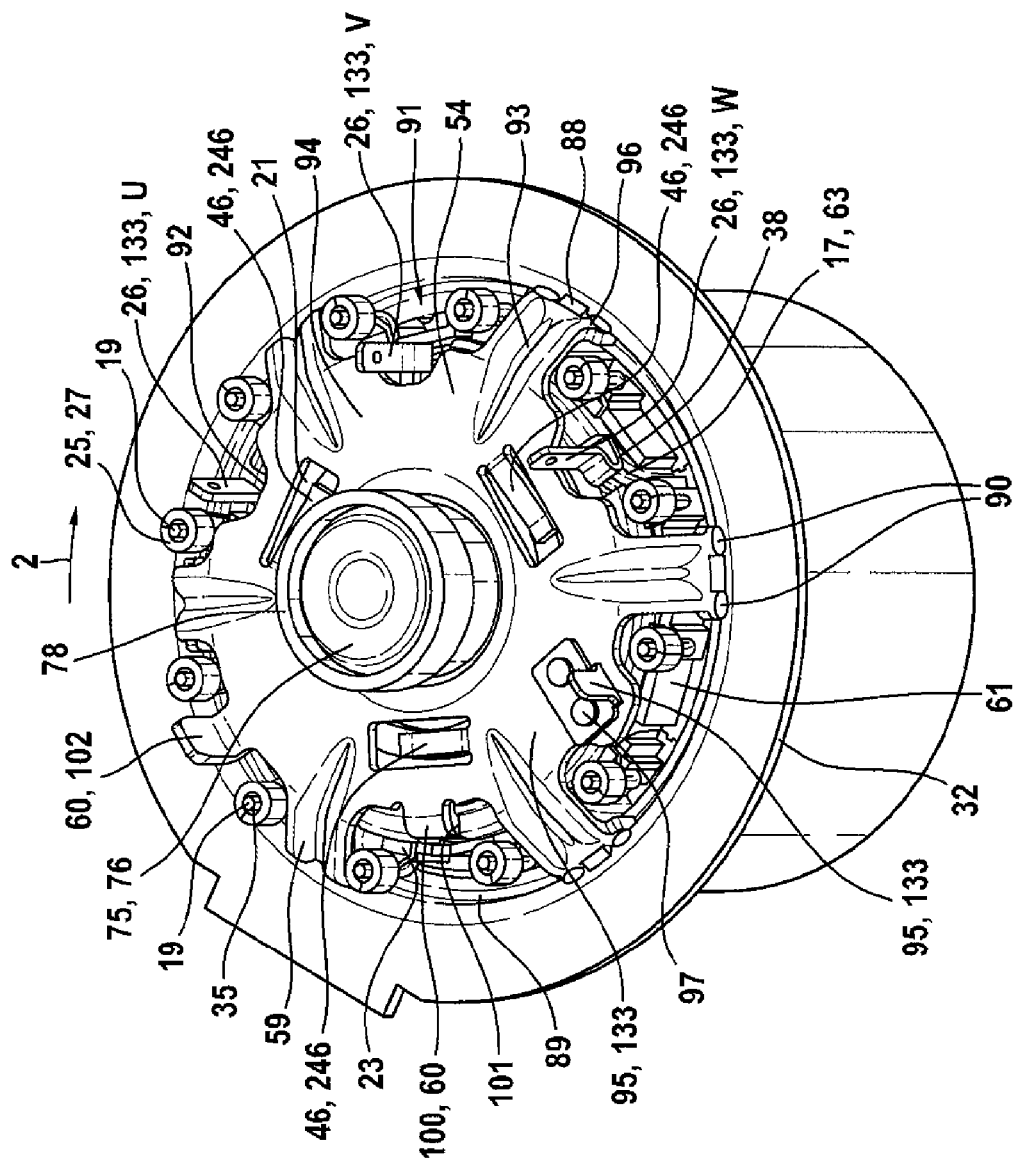
FIG. 3 shows the plan view of the mounted bearing plate according to FIG. 1, FIG. 4 schematically shows the welding process in the exemplary embodiment according to FIG. 1.

In FIG. 3, the electrical machine according to FIG. 1 is represented without the connector housing 33 and the metal cover 81. The bearing plate 54 is securely welded to the pole pot 15 at the outer radial ends 96 of the radial webs 59. For the assembly of the bearing plate 54, it is for example radially braced in an axial offset 89 of the pole pot 15. For example, arranged on the outer circumference of the bearing plate 54 are spring tongues 88, which radially brace the bearing plate 54 in an axial offset 89 of the pole pot 15. The spring tongues may be formed as axial lugs at the radial ends 96 of the webs 59 and lie radially resiliently against the inner circumference of the pole housing 15. As a result, the bearing plate 54 is exactly centered in the pole pot 15 for the welding process. In this case, a weld seam 90 is preferably formed along the radially outer edge 96 of the radial webs 59 in the circumferential direction 2. As a result, good thermal and electrical conductivity between the bearing plate 54 and the pole pot 15 is ensured. Respectively cut out between two radial webs 59 is a clearance, through which the receiving sleeves 27 and the terminal pins 26 are led out axially. In the case of this configuration, the clearances 91 are formed for example as radially open toward the pole pot 15. The terminal pins 26 are arranged radially further inward than the receiving sleeves 27. Therefore, three additional radial depressions 92 for the three terminal pins 26 are formed in the bearing plate 54, in which the terminal pins 26 can move within certain limits in the circumferential direction 2 and in the radial direction 3 on account of their resilient attachment to the interconnection board 22 by means of the resilient regions 38. In the exemplary embodiment, six clearances 91 are formed for example in the bearing plate 54, the additional radial cutouts 92 for the terminal pins 26 being formed in three adjacent clearances 91. The positioning elements 60 and a ground contact 95 for EMC interference suppression are then formed at the other clearances 91. Beads 93 running in the radial direction 3 are formed along the webs 59. These beads are formed for example as radially downwardly depressed notches. These beads 93 run from the radially outer edge 96 of the webs 59 into a radially central region 94 of the bearing plate 54, which is formed as an annular face 94 that is uninterrupted in the circumferential direction 2. In this radially central region 94, spring lugs 46, which are angled away axially downward, are punched out from the bearing plate 54 in the circumferential direction 2 as axial spring means 246. In the securely welded state of the bearing plate 54, these tangential lugs 46 press the interconnection board 22 axially against the coil formers 36. As a positioning element 60, a first positioning lug 100 is bent axially downward, where it reaches into a corresponding mating element 101 of the interconnection board 22, in order to prevent twisting of the interconnection board 22. Also on the bearing plate 54 there is a second centering lug 102 angled away axially upward as a further positioning element 60, which reaches into a corresponding second mating element 103 on the connector housing 33, in order to prevent twisting of the connector housing 33. As a result, by means of the bending-punching process for producing the bearing plate 54, at the same time the axial prestressing with respect to the interconnection board 22 and the twisting prevention of the interconnection board 22 and the connector housing 33 are realized. Arranged on the bearing plate 54 is the ground contact 95, which may for example be contacted with an interference suppression capacitor and/or the sensor element 74 of the connector housing 33. Since the surface of the bearing plate 54 may be coated with zinc or an oxide, the ground contact 95 is formed from a metal with good electrical conduction, for example from copper. For this purpose, the ground contact 95 is produced as a separate component and fastened on the surface of the bearing plate 54, for example by means of rivets 97. Alternatively, the ground contact 95 may however also be formed directly on the surface of the bearing plate 54, on which an axially resilient spring contact 262, 264 can be placed. In the radially central region of the bearing plate 54, a cylindrical continuation 53 is formed on as a second bearing seat 55 on the uninterrupted annular region 94 of the bearing plate 54. In this case, the axial continuation 53 extends approximately over the entire axial region of the interconnection board 22. The radial webs 59 are in this case formed as convexly curved or angled away, so that the bearing plate 54 encloses the interconnection board 22 virtually completely in the axial direction. The outer ring 58 of the second rolling bearing 56 is pressed into the axial continuation 53. Adhesively fixed in the magnet holder 78 of the rotor shaft 20 is a disk-shaped sensor magnet 76, which acts as a signal transmitter 75 for the rotational position identification.

Figure 4:
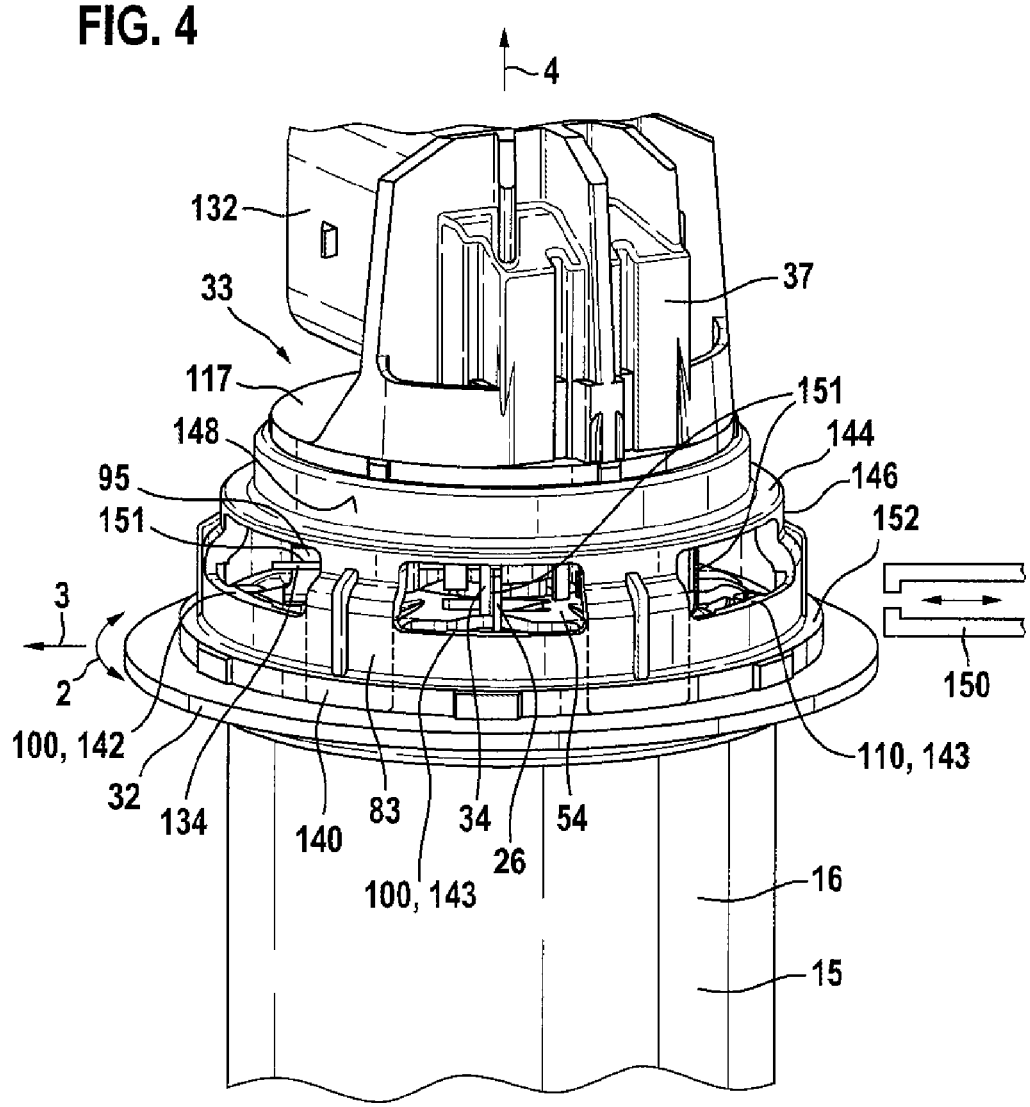

FIG. 4 shows an electrical machine 10, in which the connector housing 33 has been placed onto the pole pot 15 before the metal cover 81 is fitted over the connector housing 33. The connector housing 33 has at its open end, toward the pole pot 15, an edge 140 that is uninterrupted over the entire circumference. From the lower edge 140 there extends in the axial direction 4 the circumferential wall 83, in which radial windows 110 for the reaching through of welding tools 150 are formed. Formed on the left side in the connector housing 33 is a first radial window 142, through which the welding tools 150 are led in radially. For the welding operation, here the ground contact 95 is then pressed against the free capacitor terminal 134 in the circumferential direction 2, and then welded. Arranged adjacently in the circumferential direction 2 are then the further radial windows 143, through which the terminal pins 26 are welded to the contact lugs 34 of the connector housing 33 by means of the welding tools 150. It is evident that the terminal pins 26 extend in the axial direction 4 parallel to the contact lugs 34. In this case, they overlap in the axial direction 4 and lie against one another with respect to the circumferential direction 2. During the welding operation, the connector housing 33 is pressed axially against the pole pot 15 by an assembly device. In this exemplary embodiment, the stator 16 has for example twelve individual coils 63, which are interconnected to form three phases U, V, W by means of the interconnection board 22. In the case of this configuration, the welded connections 151 between the terminal pins 26 and the contact lugs 34—and in particular similarly the welded connection 151 between the ground contact 95 and the free capacitor terminal 134—are realized with an identically formed welding tool 150. The circumferential wall 83 has here in the region of the radial windows 110 a radial offset 146, in order to form an annular axial shoulder 144 for the sealing ring 84. The sealing ring 84 is placed axially onto this annular shoulder 144, so that it lies radially against an annular radial sealing face 148 of the circumferential wall 83. In this case, the transition from the cover wall 117 to the terminal connector 37 lies radially completely within this radial sealing face 148. Formed on at the annularly uninterrupted edge 140 is an axial stop 152, on which an axial spring 85 can be supported. The axial spring 85 is formed for example as a tube spring 185, which is fitted axially onto the connector housing 33 up to the axial stop 152. As can be seen in FIG. 1, the metal cover 81 is then assembled axially over the connector housing 33, so that its cylindrical metal wall 82 covers over the radial windows 110. In this case, the sealing ring 84 seals off the radial sealing face 148 of the connector housing 33 with respect to the inner side of the metal cover 81. During the assembly of the metal cover 81, it is pressed against the axial spring force of the axial spring 85 axially against the flange 32 of the pole housing 15 and welded over the entire circumference by a weld seam 154. The terminal connector 37 in this case protrudes out of the metal cover 81 through a clearance 39 on the axially upper side. In a preferred configuration, the current pins 43 and sensor pins 41 are then angled away in the radial direction 3, so that a corresponding customer connector can be pushed in the radial direction 3 into the connector collar 132. In this case, the terminal connector 37 does not protrude with the connector collar 132 in the radial direction 3 beyond the circular clearance 39 in the metal cover 81. In an alternative configuration, the current pins 43 and sensor pins 41 may also extend axially in the terminal connector 37, so that the corresponding customer connector can be pushed onto the connector collar 132 from above in the axial direction 4. If instead of the free second capacitor terminal 134 a separate contact spring 262 or an integrated spring arm 264 is formed on the second contact element 260 for the capacitor, there is no need for the welded connection 151 and the first window 141 for the contacting of the free capacitor terminal 134. On the other hand, the ground contact is then formed directly during the axial placement of the connector housing 33 onto the pole pot by the resilient contacting with the bearing plate 54. In the case of this configuration, the connector housing 33 then has altogether only precisely three windows 143 for the U, V, W welding. In a variation of the configuration, the windows 142, 143 may also be formed as open axially downward (represented by dashed lines in FIG. 4). In this case, the edge 140 is no longer uninterrupted over the circumference, but has interruptions in the region of the windows 142, 143.

Consequently, in these regions the connector housing 33 is only supported on the pole housing 15 by axial webs between the windows 142, 143.

In the method according to the invention for producing the electrical machine 10, first the stator 16 is inserted into the pole pot 15. For this purpose, the coil formers 36, formed as individual segments 62, are provided with an insulating mask 61 and wound with electrical windings 17, before these are inserted into the pole housing 15. After that, the rotor 18 is fitted into the pole pot 15, so that the rotor shaft 20 is pressed securely into the first rolling bearing 72. After that, the interconnection board 22 is arranged axially on the coils 63 and electrically contacted, preferably welded, with the coil wire ends 19. After that, the compression spring 86 is fitted axially onto the rotor body 65, the inner ring 57 axially prestressing the compression spring 86 during the assembly of the bearing plate 54. At the same time, the axial spring means 246 brace the bearing plate 54 axially with respect to the interconnection board 22. Under this prestressing, the bearing plate 54 is welded at its radially outer ends to the pole pot 15. In this case, the first centering lug 100 of the bearing plate reaches into corresponding mating elements 101 of the interconnection board 22. After the secure welding of the bearing plate 54, the rotor 18 is reliably mounted in a radially and axially vibration-damped manner in the pole pot 15. In this state, the terminal pins 26 and the second centering lug 102 project axially upward, so that the connector housing 33 can be fitted with its mating element 103 axially onto the centering lug 102. In this case, the connector housing 33 lies axially against the flange 32 of the pole pot 15. At the radial windows 110 in the connector housing 33, the terminal pins 26 can be welded to the electrical contacts 30 of the connector housing 33. Similarly, the interference suppression capacitor 111 of the connector housing 33 can be welded to the ground contact 95, or the contact spring 262 or the spring arm 264 can be pressed against the bearing plate 54. After that, the sealing ring 84 is fitted onto the radial sealing face 148 of the connector housing 33 and is braced with respect to it during the assembly of the metal cover 81. The metal cover 81 lies in turn against the flange 32 and is welded in a sealing manner to the pole pot 15 over the entire circumference. As a result, the axially upwardly projecting terminal connector 37 is reliably sealed off with respect to the housing 14 of the electrical machine 10. In order to compensate for different material expansions of the individual components over a great temperature range, an axial spring 85 is prestressed between the metal cover 81 and the connector housing 33 and presses the connector housing 33 axially against the pole pot 15.

It should be noted that, with regard to the exemplary embodiments shown in the figures and in the description, various possibilities of combining the individual features with one another are possible. Thus, for example, the specific formation and arrangement of the interference suppression capacitor 111 and the electrical contacting of the sensor element 74 can be varied. Similarly, the position of the contact lugs 34 and of the insert conductors 116 can be adapted to the corresponding connector housing 33. The design of the terminal connector 37 and of the signal transmitter 75 on the rotor shaft 20 may be varied according to customer requirements. The number and form of the radial windows 110 and similarly the number of welded connections 151 to be made through the windows 110 can be adapted to requirements. For example, the ground contact 95 may also be produced as one part with the bearing plate 54 and, if applicable, the terminal pins 26 and or the contact lugs 34 may be radially angled away or form a fork contact 114 with one another. The welded connection 151 is preferably formed by means of resistance welding, but laser welding is also possible. In the case of a variant, the terminal pins 26 may also be welded in a different way than the ground contact 95. The electrical machine 10 is preferably used in a gear-transmission drive unit as an engine compartment actuator in a motor vehicle, for example for adjusting movable parts or operating pumps in the engine compartment, but is not restricted to such applications.

The invention claimed is:

1. An electrical machine (10) comprising a pole pot (15), in which a stator (16) and a rotor (18) are held, and a connector housing (33) that lies axially against an open side of the pole pot (15), the connector housing (33) having an integrated terminal connector (37) and electrical contacts (30, 34), each of the electrical contacts (30, 34) of the connector housing (33) being connected to respective mating electrical contacts (26, 133) of the stator (16) to form a pair of connected contacts,
wherein the connector housing (33) has an annular circumferential wall (83) having radial windows (110), each radial window (110) being adjacent to a respective pair of connected contacts and being configured to allow a tool (150) to be inserted through the radial window (110) to connect the respective pair of connected contacts.

2. The electrical machine according to claim 1, characterized in that the electrical contacts (30, 34) of the connector housing (33) are welded to the mating electrical contacts (26, 133) of the stator (16).

3. The electrical machine according to claim 1, characterized in that the electrical contacts (30, 34) of the connector housing (33) on one hand as contact lugs (34) project axially downward on an inner side (29) of the connector housing (33), and on an other hand as current pins (43) end at the terminal connector (37), and the mating electrical contacts (26, 133) of the stator (16) are formed as terminal pins (26) of conductor elements (23) of an interconnection board (22) that are electrically connected to electrical windings (17) of the stator (16).

4. The electrical machine according to claim 3, characterized in that the interconnection board (22) is arranged axially on the stator (16) and a bearing plate (54) for the mounting of the rotor (18) is fastened to the open end of the pole pot (15) axially over the interconnection board (22), wherein the terminal pins (26) protrude out of a body of plastic (21) of the interconnection board (22) axially through the bearing plate (54) into the connector housing (33).

5. The electrical machine (10) according to claim 1, characterized in that the mating electrical contacts (26, 133) and the electrical contacts (30, 34) of the connector housing (33) run parallel to one another, overlapping in the axial direction (4), and at least approximately lie against one another in the circumferential direction (2).

6. The electrical machine (10) according to claim 1, characterized in that the mating electrical contacts (26, 133) of the stator (16) are connected to a contact plate (22) by way of resilient regions (38) and/or the electrical contacts (30, 34) of the connector housing (33) are connected to the connector housing (33) by way of elastic regions (118).

7. The electrical machine (10) according to claim 1, characterized in that arranged on an inner side (29) of the connector housing (33) is an interference suppression capacitor (111), which has as one of the electrical contacts (30, 34) of the connector housing (33) a free capacitor terminal (134) which is electrically connected to the pole housing (15) by way of a bearing plate (54).

8. The electrical machine (10) according to claim 1, characterized in that a bearing plate (54) has axial centering elements (60) and/or clearances for receiving centering mating elements (103), by means of which the connector housing (33) is exactly positioned in its rotational position with respect to an interconnection board (22) by way of the bearing plate (54), so that the electrical contacts (30, 34) of the connector housing (33) lie against the corresponding mating electrical contacts (26, 133) of the stator (16).

9. The electrical machine (10) according to claim 1, characterized in that the connector housing (33) is formed from plastic and has a circular uninterrupted axial edge (140), which closes off the radial windows (110) axially downwardly.

10. The electrical machine (10) according to claim 1, characterized in that fitted axially over the connector housing (33) is a metal cover (81), which is welded in a sealed manner to the pole pot (15), wherein a terminal connector (37) with current pins (43) protrudes axially outward oppositely from the rotor (18) through a clearance (39) in the metal cover (81).

11. A method for producing an electrical machine (10) according to claim 1, comprising:
assembly of the stator (16) in the pole pot (15) in such a way that electrical mating contacts (133) of the stator (16) project axially upward;
placement of the connector housing (33) onto the pole pot (15) in such a way that electrical contacts (30) in the connector housing (33) project axially downward;
radial reaching of welding tools (150) through the radial windows (110) in the circumferential wall (83) of the connector housing (33); and
welding of the electrical contacts (30, 34) of the connector housing (33) to the corresponding electrical mating contacts (26, 133) of the stator (16).

12. The method according to claim 11, characterized in that, for the assembly of the stator (16),
coil formers (36) with electrical windings (17) are inserted into the pole pot (15),
the rotor (18) is inserted into the pole pot (15),
the interconnection board (22) is placed onto the stator (16) and is contacted with the electrical windings (17), and
a bearing plate (54) for the rotor (18) is arranged axially above an interconnection board (22) and is securely welded to the pole pot (15), wherein electrical terminal pins (26) of the interconnection board (22) are led axially through the bearing plate (54) and protrude axially upward beyond the bearing plate (54).

13. The method according to claim 11, characterized in that, before the placement of the connector housing (33) onto the pole pot (15),
first a magnetic sensor (74, 77) is fastened to an inner side (29) of the connector housing (33) and terminal legs (106) of the magnetic sensor (74, 77) are electrically contacted with insert conductors (116) of the connector housing (33), and
an interference suppression capacitor (111) is fastened to the inner side (29) of the connector housing (33), and a first capacitor terminal (128) is electrically contacted with the magnetic sensor (74, 77).

14. The method according to claim 11, characterized in that the electrical contacting of the mating electrical contacts (26, 133) of the stator (16) with the electrical contacts (30, 34) of the connector housing (33) is carried out by means of the same welding process as the electrical contacting of a free capacitor terminal (134) with an axially upwardly projecting ground contact (95) of a bearing plate (54).

15. The electrical machine (10) according to claim 1, characterized in that arranged on an inner side (29) of the connector housing (33) is an interference suppression capacitor (111), which has as an electrical contact (30) a free capacitor terminal wire (134) which is electrically connected to the pole pot (15) by way of a bearing plate (54), wherein a interference suppression capacitor (111) is connected to a rotational position sensor (74) for the rotor (18), which is securely adhesively fixed on the inner side (29) of the connector housing (33).

16. The electrical machine (10) according to claim 1, characterized in that a bearing plate (54) has axially angled-away centering lugs (100, 102) and/or clearances for receiving centering mating elements (103), by means of which the connector housing (33) is exactly positioned in its rotational position with respect to an interconnection board (22) by way of the bearing plate (54), so that the electrical contacts (30, 34) of the connector housing (33) lie against the corresponding mating electrical contacts (26, 133) of the stator (16).

17. A method for producing an electrical machine (10) according to claim 1, comprising:
assembly of the stator (16) in the pole pot (15) in such a way that the electrical mating contacts (26, 133) of the stator (16) project axially upward;
placement of the connector housing (33) onto the pole pot (15) in such a way that the electrical contacts (30, 34) in the connector housing (33) project axially downward, wherein the connector housing (33) is pressed into a cylindrical offset (89) at the open side of the pole pot (15);
radial reaching of the tools (150) through radial windows (110) in the circumferential wall (83) of the connector housing (33); and
welding of the electrical contacts (30, 34) of the connector housing (33) to the corresponding electrical mating contacts (26, 133) of the stator (16) by means of resistance welding or laser welding.

18. The method according to claim 17, characterized in that, for the assembly of the stator (16),
coil formers (36) with electrical windings (17) are inserted into the pole pot (15),
the rotor (18) is inserted into the pole pot (15),
an interconnection board (22) is placed onto the stator (16) and is contacted with the electrical windings (17),
a bearing plate (54) for the rotor (18) is arranged axially above the interconnection board (22) and is securely welded to the pole pot (15), wherein the mating electrical contacts (26, 133) of the interconnection board (22) are led axially through a bearing plate (54) and protrude axially upward beyond the bearing plate (54).

19. The method according to claim 17, characterized in that, before the placement of the connector housing (33) onto the pole pot (15), first a magnetic sensor (74, 77) is fastened to an inner side (29) of the connector housing (33) and terminal legs (106) of the magnetic sensor (74, 77) are electrically contacted with insert conductors (116) of the connector housing (33), an interference suppression capacitor (111) is fastened to the inner side (29) of the connector housing (33), and a first capacitor terminal (128) is electrically contacted with the magnetic sensor (74, 77), wherein a second free capacitor terminal (134) projects freely toward one of the radial windows (110) of the connector housing (33).

20. The electrical machine according to claim 1, wherein the connector housing (33) has a circular uninterrupted axial edge (140) from which the circumferential wall (83) extends.

21. An electrical machine (10) comprising a pole pot (15), in which a stator (16) and a rotor (18) are held, and a connector housing (33) that lies axially against an open side of the pole pot (15), the connector housing (33) having an integrated terminal connector (37), wherein the connector housing (33) has a circumferential wall (83) having windows (110) through which electrical contacts (30) of the connector housing (33) contact electrical mating contacts (133) of the stator (16), wherein a bearing plate (54) has axial centering elements (60) and/or clearances for receiving centering mating elements (103), by means of which the connector housing (33) is exactly positioned in its rotational position with respect to an interconnection board (22) by way of the bearing plate (54), so that the electrical contacts (30, 34) of the connector housing (33) lie against the corresponding mating electrical contacts (26, 133) of the stator (16).

22. An electrical machine (10) comprising a pole pot (15), in which a stator (16) and a rotor (18) are held, and a connector housing (33) that lies axially against an open side of the pole pot (15), the connector housing (33) having an integrated terminal connector (37), wherein the connector housing (33) has a circumferential wall (83) having windows (110) through which electrical contacts (30) of the connector housing (33) contact electrical mating contacts (133) of the stator (16), wherein fitted axially over the connector housing (33) is a metal cover (81), which is welded in a sealed manner to the pole pot (15), wherein a terminal connector (37) with current pins (43) protrudes axially outward oppositely from the rotor (18) through a clearance (39) in the metal cover (81).

* * * * *